United States Patent
Morris et al.

(10) Patent No.: US 10,223,067 B2
(45) Date of Patent: Mar. 5, 2019

(54) LEVERAGING ENVIRONMENTAL CONTEXT FOR ENHANCED COMMUNICATION THROUGHPUT

(71) Applicant: Microsoft Technology Licensing, LLC, Redmond, WA (US)

(72) Inventors: Meredith Morris, Bellevue, WA (US); Shaun K. Kane, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 167 days.

(21) Appl. No.: 15/211,794

(22) Filed: Jul. 15, 2016

(65) Prior Publication Data

US 2018/0018144 A1    Jan. 18, 2018

(51) Int. Cl.
    *G10L 15/00*      (2013.01)
    *G06F 3/16*      (2006.01)
    (Continued)

(52) U.S. Cl.
    CPC .............. *G06F 3/167* (2013.01); *G06F 3/013* (2013.01); *G06F 3/0237* (2013.01);
    (Continued)

(58) Field of Classification Search
CPC ......... G10L 15/22; G10L 15/26; G10L 21/10; G10L 25/78; G10L 13/02; G10L 15/24;
(Continued)

(56) References Cited

U.S. PATENT DOCUMENTS 6,795,806 B1    9/2004   Lewis et al.
8,635,058 B2 *   1/2014   Patel ............... G06Q 30/04
                                                     704/10
(Continued)

FOREIGN PATENT DOCUMENTS

WO     WO2009111499 A2    9/2009

OTHER PUBLICATIONS

H. Fang et al., "From captions to visual concepts and back," 2015 IEEE Conference on Computer Vision and Pattern Recognition (CVPR), Boston, MA, 2015, pp. 1473-1482.*

(Continued)

*Primary Examiner* — Edgar X Guerra-Erazo
(74) *Attorney, Agent, or Firm* — Drinker Biddle & Reath LLP

(57) ABSTRACT

An environmental context of a user may be taken into account to enhance the user's communication throughput. An "environmental context" can include spatial surroundings of a user, device, and/or sensor of the device and more broadly to denote the context of the user in a multiplicity of environments such as, for example, the surroundings of a user, a digital environment such as the user or other individuals' interactions with or made near a device, etc. The techniques can include obtaining contextual data to provide context-predicted suggestions of words and/or phrases that a user can select to be output on the user's behalf. In some examples, the techniques can also use contextual data to weight, sort, rank, and/or filter word and/or phrase suggestions.

20 Claims, 11 Drawing Sheets

(51) Int. Cl.
  G06F 3/01      (2006.01)
  G06F 3/023     (2006.01)
  G06F 3/0488    (2013.01)
  G09B 21/00     (2006.01)
  G10L 13/04     (2013.01)
  G10L 15/26     (2006.01)
  G06F 17/30     (2006.01)

(52) U.S. Cl.
  CPC ........ *G06F 3/04886* (2013.01); *G06F 17/301* (2013.01); *G06F 17/3012* (2013.01); *G06F 17/30038* (2013.01); *G06F 17/30244* (2013.01); *G09B 21/00* (2013.01); *G10L 13/043* (2013.01); *G10L 15/26* (2013.01)

(58) Field of Classification Search
  CPC ......... G10L 17/10; G06F 3/167; G06F 3/017; G06F 3/04842; G06F 17/2765; G06F 1/3215; G06F 1/3231; G06F 3/013; G06F 3/048; G06F 9/4443; G06F 9/4446; G06F 2203/04803; G06F 3/0219; G06F 3/0237; G06F 3/041; G06F 3/0412; G06K 2009/00738
  See application file for complete search history.

(56) References Cited

U.S. PATENT DOCUMENTS

| | | | |
|---|---|---|---|
| 8,819,030 | B1 | 8/2014 | Freed et al. |
| 9,251,717 | B2 | 2/2016 | LoStracco et al. |
| 9,285,891 | B2* | 3/2016 | Singh ............... G06F 3/013 |
| 2005/0208457 | A1 | 9/2005 | Fink et al. |
| 2008/0243473 | A1* | 10/2008 | Boyd ............... G06F 17/289 |
| | | | 704/2 |
| 2013/0135196 | A1 | 5/2013 | Park et al. |
| 2013/0169560 | A1 | 7/2013 | Cederlund et al. |
| 2013/0241805 | A1 | 9/2013 | Gomez |
| 2013/0293577 | A1* | 11/2013 | Perez ............... G02B 27/017 |
| | | | 345/633 |
| 2014/0152882 | A1 | 6/2014 | Samek et al. |
| 2014/0184550 | A1 | 7/2014 | Hennessey et al. |
| 2014/0237366 | A1* | 8/2014 | Poulos ............... G06F 3/013 |
| | | | 715/728 |
| 2014/0334666 | A1 | 11/2014 | Lankford et al. |
| 2015/0011194 | A1* | 1/2015 | Rodriguez ......... G06K 9/00986 |
| | | | 455/414.1 |
| 2015/0116540 | A1 | 4/2015 | Gilman |
| 2015/0220157 | A1 | 8/2015 | Marggraff et al. |
| 2015/0310539 | A1 | 10/2015 | McCoy et al. |
| 2017/0160813 | A1* | 6/2017 | Divakaran ............... G06F 3/017 |
| 2017/0169595 | A1* | 6/2017 | Hato ..................... G06T 11/00 |

OTHER PUBLICATIONS

Brunner, P., Joshi, S., Briskin, S., Wolpaw, J. R., Bischof, H., & Schalk, G. (2010). Does the 'P300' speller depend on eye gaze?. Journal of neural engineering, 7(5), 056013.*

Ball, L. J., Fager, S., & Fried-Oken, M. (2012). Augmentative and alternative communication for people with progressive neuromuscular disease. Physical Medicine and Rehabilitation Clinics, 23(3), 689-699.*

"Tobii Dynavox Communicator 5" Users Manual published Mar. 2015, accessible from "http://tdvox.web-downloads.s3.amazonaws.com/Communicator/documents/TobiiDynavox_Communicator5_GettingStartedGuide_v1-0_en-US_WEB.pdf".*

"International Search Report and Written Opinion Issued in PCT Application No. PCT/US2017/041288", dated Sep. 27, 2017, 11 Pages.

Sharma, et al., "Research Issues in Designing Improved Eye Gaze Based Hci Techniques for Augmentative and Alternative Communication", In International Journal of Emerging Technologies in Computational and Applied Sciences, vol. 6, Issue 2, Sep. 2013, pp. 149-153.

* cited by examiner

LEVERAGING ENVIRONMENTAL CONTEXT FOR ENHANCED COMMUNICATION THROUGHPUT

BACKGROUND

People with speech production or comprehension impairments often rely on alternative and augmentative communication ("AAC") technologies in order to regain these functions. Many AAC techniques suffer from slow throughput (i.e., rate of production of communication). For example, for people without substantial cognitive or vision impairments, such as people locked-in syndromes such as ALS, eye gaze based typing has become a common AAC technology. However, eye gaze typing has a throughput that can be an order of magnitude slower than unimpaired spoken conversation. This impedes a wide swath of people from meaningfully engaging society.

Additionally, those that find machine-human interfaces difficult to learn or that are unpracticed with a particular machine-human interface may experience communication throughput impairment. Moreover, language barriers also impede communication throughput between people that speak different languages.

SUMMARY

This summary is provided to introduce simplified concepts relating to leveraging environmental context for enhanced communication throughput. This summary is not intended to identify essential features of the claimed subject matter, nor is it intended for use in determining the scope of the claimed subject matter.

The techniques described herein leverage an environmental context of a user to enhance the user's communication throughput. In some examples, the techniques discussed herein include obtaining, detecting, and/or capturing information regarding a context of a user. In some examples, the techniques discussed herein include capturing an image of the surroundings of a user, identifying a salient object in the image and/or obtaining a salient object label from the image, and generating a list of words and/or phrases to provide to the user for selection by the user to be output on behalf of the user.

In some examples, the techniques discussed herein can use additional contextual information to decide whether or not to capture an image. In some examples, the techniques can use contextual data to generate words and/or phrases with or without a captured image. In some examples, the techniques described herein can use the contextual data to weight, filter, and/or sort the generated words and/or phrases.

The techniques described herein can be utilized to enhance the communication throughput for impaired and/or unimpaired users. In some examples, the techniques discussed herein can be used to teach a second language or to enhance cross-language communication throughput for one or more users.

BRIEF DESCRIPTION OF DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

Figure 1:
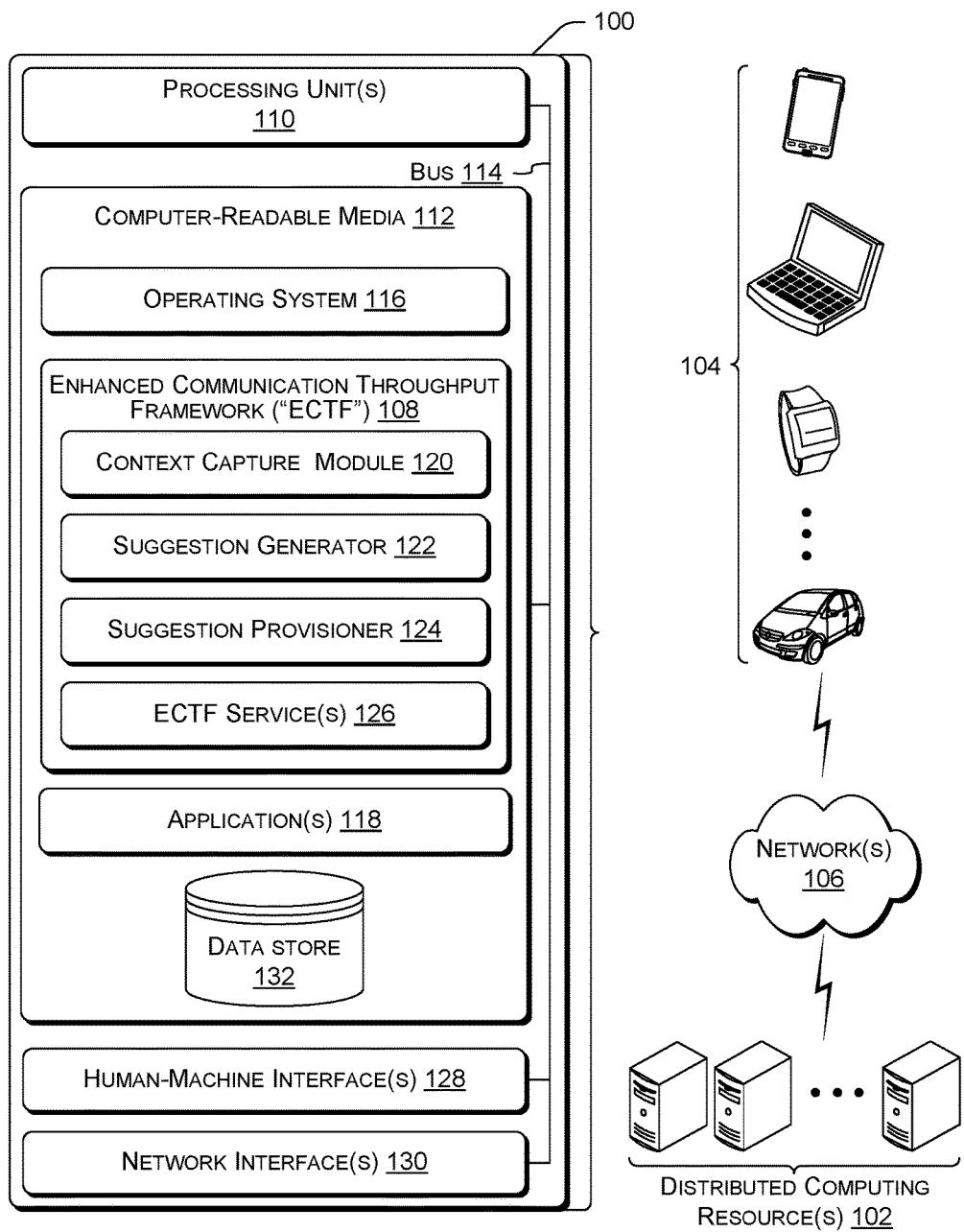
FIG. 1 is a block diagram of an example device configured to enhance communication throughput of a user by leveraging an environmental context as discussed herein.

This disclosure is directed to techniques to enhance communication throughput by leveraging an environmental context. As used herein, "environmental context" means the context of the user in one or more of a multiplicity of environments such as, for example, the physical surroundings of a user and/or a digital environment such as a device, application, and/or service with which the user or another individual is interacting. "Environmental context" is sometimes referred to as "contextual data." In some examples, the techniques discussed herein include obtaining, detecting, and/or capturing information regarding an environment of a user (e.g., spatial surroundings, digital environment, etc.). In some examples, the techniques discussed herein include capturing an image of the physical surroundings of a user. In these examples, the techniques discussed herein can also identify one or more objects in the captured image that are noticeable by a human and/or potentially relevant to an utterance of a user (i.e., a salient object). In some examples, the techniques discussed herein can generate a list of words and/or phrases to provide to the user for selection by the user to be output on behalf of the user. In some examples, the words and/or phrases can be generated based at least in part on the salient objects that appear in the image and/or the image itself. In some examples, the spatial surroundings of a user can include one or more objects e.g., structural features, persons, physical objects, perceptible signals such as emitted light).

In some examples, the techniques discussed herein can use contextual data to decide whether or not to capture an image. In some examples, the contextual data used to decide not to capture an image can include an environment identifier. Environment identifiers can include, for example, private locations (e.g., rest room, bedroom), personally identifiable locations (e.g., home, car, living room, workplace, school, friend group "A"), public locations (e.g., grocery store, movie theater), digital environments (e.g., texting, video-chatting), etc. In some examples, the environment identifier can be derived from contextual data (e.g., co-occurrence of salient objects in a recently-captured image, application data of a device, location information). In some examples, the environmental context includes the contextual data and the techniques discussed herein can generate words and/or phrases, based at least in part on the contextual data, to provide to the user for selection by the user and/or to be output on behalf of the use.

In some examples, the contextual data may have a propensity to effect an utterance of the user. For example, if the user has just entered a grocery store, that fact has a propensity to influence utterances of the user (e.g., the user is more likely to desire to comment on or ask questions about things in the store) or if the user has recently watched a TV show using a device of the user's, when the user comes in contact with friends or co-workers the fact that the user watched the TV show is contextual data that has a propensity to effect utterances of the user.

In some examples, contextual data can include or one or more of:

gaze data (and/or objects corresponding to the gaze data) associated with the user;

time elapsed since a last utterance of the user or an operation conducted on or on behalf of the user (e.g., a time since medical assistance or medication was provided to the user);

an activity identifier inferred from motions of the user received from the one or more sensors e.g., pressure sensors senses that a bed-ridden individual has not moved or has fallen, an accelerometer and/or gyroscopes that motion data corresponds to an activity such as, for example, sitting, running, walking, biking, typing, etc.);

application data obtained from an application (e.g., previous utterances submitted to the application, selections of portions of the application for input, an active portion of the application, a purpose or function of the application, application use history, application requests, stored application data such as calendar events, photos, or geo-locations) or by querying the operating system regarding the application (e.g., an up-time for the application, a purpose of the application, portions of a register accessed by the application);

operation system information or information provided by the operation system (e.g., a time of day, device and/or software information);

a detected location of the user;

an utterance output destination or purpose (e.g., selection of a field, selection of an option for display, audio replication, and/or transmission, such as via a text-messaging service, entry as an Internet search);

a previous utterance obtained from the camera, the microphone, the operating system, the application, or a memory, or by a network interface (e.g., utterances of the user and/or other persons, utterances recorded by a service accessible by a network interface);

phonological, syntactical, or semantical information of previous utterances; a salient object identified in an image obtained by the camera or otherwise retrieved by the device; or an environment identifier derived from a co-occurrence of a subset of the contextual data (e.g., the co-occurrence of salient object labels in an image such as, for example, "then labels Onion," "Knife," "Spoon," "Table," "Sink," "Mixing Bowl," and "Spouse," and/or other contextual information could be associated with a personally-identifiable environmental identifier such as, for example, "home" or "kitchen").

In some examples, the techniques described herein can generate words and/or phrases based on the contextual data by providing at least a subset of the contextual data to one or more services that can produce keywords based at least in part on the contextual data. In some examples, the techniques described herein can provide an image of the user's surroundings to a vision service via an API that is configured to identify salient object(s) in the image and determine label(s) for the salient object(s). In some examples, the vision service can identify salient objects and return salient object labels responsive to being provided the image and the techniques described herein can present a representation of at least one of the salient object labels to the user.

In some examples, the image can be retrieved from a memory of a computing device. In some examples, image can be retrieved from photos stored locally (e.g., on a camera roll, on an SD card) and/or from photos stored remotely (e.g., from a photo sharing site, social media site, search engine image search results). For example, the user may want to utter something regarding an image other than an image of the user's immediate surroundings at the time.

In some examples, the techniques described herein can further use at least a subset of words to generate phrases via one or more of a natural language processing service, heuristic phrases (e.g., phrases commonly associated with the provided words, static list of common phrases, classifier-generated heuristic phrases), or a human service (e.g., provision of the subset of the words and/or contextual data to a human for generation of the phrases) (the "phrase generation service(s)"). In some examples, the subset of words can include the one or more object labels received from the vision service. In some examples, the contextual data already includes words that can be provided to the phrase generation service(s). For example, an utterance history (e.g., previous selections of utterances, received and/or sent texts) may already be substantially ready to provide. In some examples, the techniques discussed herein can prepare the data for provision to such a service (e.g., by using natural language processing to select key terms of previous utterances; identifying from application data pertinent information such as, for example, by using metadata to identify salient information such as a TV show name). In some examples, the techniques discussed herein can include a classifier trained on received contextual data and user selections to determine what words contained in or derivable from the contextual data should be provided to the phrase generation services).

In some examples, the techniques can use contextual data to generate words and/or phrases with or without a captured image. In some examples, the techniques described herein can use the contextual data to weight, filter, and/or sort the generated words and/or phrases. In some examples, the techniques described herein can use the contextual data to weight the generated words and/or phrases at the time the words and/or phrases are generated. For example, the techniques described herein can supply at least a subset of the contextual data to a service to generate the words and/or phrases and the techniques described herein can pre-weight the subset or can weight the generated words and/or phrases after they are generated based on at least a same or different subset of the contextual data. For example, the contextual data can identify a person as a salient object so the techniques described herein can weight requests for generated phrases that regard a person and/or weight generated phrases based on the identification of a person as a salient object. In this way, phrases can be generated and/or presented to the user that are more likely to be directed to a person that is present.

In some examples, weights can be used, at least in part, to sort and/or rank generated phrases. In some examples, the techniques described herein can sort generated phrases based at least in part on the contextual data. For example, the techniques described herein can group generated phrases based at least in part on weights attributed to different types of phrases. For example, types of phrases can be according to one or more of grammatical form (e.g., interrogatory, exclamation, qualitative statement), subject of the phrase (e.g., phrases regarding particular object or subject), syntax and/or semantics of previous selections or utterances (e.g., if an article was previously output a subject is more likely to be output next, previous utterances of either the user or another person, contextual semantics can disambiguate word and/or phrase prediction), intended recipient of the utterance, intended output designation to be output on a display, as speech on behalf of the user, for transmission as a text message, as a web search), context relatedness (e.g., the degree to which the phrase is related to contextual data or does not consider the contextual data, such as, for example whether the utterance is related to a salient object of the surroundings of the user), a measure of salience of an object (e.g., as determined by a classifier, heuristically determined measure of salience, as determined by an individual to which the contextual data is transmitted), etc. In some examples, the techniques described herein can rank the phrases based at least in part the weights discussed above.

Similarly, the techniques described herein can rank the generated words and/or phrases based at least in part on the weights and/or sorting discussed above e.g., rank phrases from greatest relevance to a salient object to least relevant based at least in part on the weights).

In some examples, the techniques described herein can additionally or alternatively filter the generated words and/or phrases based at least in part on at least part of the contextual data before providing the generated words and/or phrases to the user as suggestions. For example, the techniques described herein can filter the generated words and/or phrases based at least in part on selection of a salient object by the user (e.g., by interacting with a representation of the salient object), additional input front the user (e.g., if a user starts to input letters of a word, the techniques can restrict the results to words that begin with the input letter and phrases that contain an object or that generally regard a subject that starts with the letter), gaze data (e.g., if a user looks at a person the suggestions can be filtered to suggested utterances that pertain to the particular person or to people in general; if a user looks at a particular portion of a graphical user interface ("GUI") for an application such as a search field, the suggestion can be filtered to include search terms and/or interrogatories), application context filtering based on a purpose of an active application, filtering based on inputs and/or outputs of the application, filtering based on a selected portion of a GUI of the application), selection of a hardware and/or software button (e.g., an icon that indicates that the user wants to receive suggestions regarding a certain context such as, for example, surroundings or an application, or a form of suggestions such as, for example, interrogatories, exclamations, or comments), sensed activity (e.g., walking, biking, sitting, inactivity), etc.

By weighting, sorting, ranking, and/or filtering generated words and/or phrases, the techniques described herein can, in some examples, represent the weighted, sorted, ranked, and/or filtered suggestions to the user in an organized manner. In some examples, the representation can include one or more of rendering the representation of the suggestions by a display or tactile feedback portion of human-machine interface or audio by a speaker of the human-machine interface. In some examples, the techniques discussed herein can organize the representation according to one or more of the weighting, sorting, ranking, or filtering. For example, the techniques discussed herein can use the sort function to represent the suggestions in different lists or in different locations on a display. In some examples, the techniques discussed herein can use weighting, sorting, ranking, and/or filtering to determine a location in a display to display more weighted suggestions since different portions of a display are more prime because users are more likely to look at them and/or to determine a subset of suggestions to represent when not all of the suggestions can be represented at once due to display space, understandability, settings based on a user's cognitive abilities, a duration of time).

The techniques described herein can be utilized to enhance the communication throughput for impaired and/or unimpaired users. In some examples, the techniques discussed herein can be used to teach a second language or to enhance cross-language communication throughput for one or more users. In some examples, the generated words and/or phrases can include words and/or phrases in one or more languages. In some examples, the suggestions provided to the user can include words and/or phrases in both a first language and a second language. In some examples, the suggestions provided to the user can include words and/or phrases in a language defined by the user. In some examples, the suggestions provided to the user can include words and/or phrases in a first language and the selected suggestions can be output in a second language.

In some examples, the techniques discussed herein "enhance" communication by reducing communication throughput time or, put differently but equivalently, the techniques can "enhance" communication throughput by increasing throughput rates a rate at which communication is produced such as, for example, spoken words per minute, words displayed per minute, words transmitted per minute, etc.). In some examples, the techniques discussed herein enhance technologies that include interfaces designed for a person to interact with to communicate via the machine for which the interface is designed.

As used herein, the generated words and/or phrases are collectively referred to herein as suggestions. In some examples, the generated words and/or phrases are predictions (i.e., calculated anticipations) of words and/or phrases that a user may like to utter. They are therefore referred to herein interchangeably as predicted words/phrases and candidate utterances. In some examples, an utterance can include any communication method available to a user. For example, an utterance can include computer-generated speech, text (e.g., for display and/or as input such as, for example, text in a web search query), pictographic representations, and/or transmission or output of any communication by or on behalf of a user.

The term "techniques" can refer to system(s), method(s), computer-readable media encoded with instructions, module(s), and/or algorithms, as well as hardware logic (e.g., Field-programmable Gate Arrays (FPGAs), Application-Specific Integrated Circuits (ASICs), Application-Specific Standard Products (ASSPs), System-on-a-chip systems (SOCs), Complex Programmable Logic Devices (CPLDs)), etc. as permitted by the context described above and throughout the document.

Example Device

FIG. 1 is a block diagram depicting components of an example device 100 configured to operate according to the techniques discussed herein to enhance communication throughput by leveraging environmental data. The example device 100 can represent one or more of distributed computing resources 102 and/or computing devices) 104, or other computing devices implementing some or all of the techniques described herein. In some examples, the example device 100 can include distributed computing resource(s) 102 that can communicate with one another and with external devices, such as computing device(s) 104, via one or more network(s) 106. In at least one example, the distributed computing resources 102 can implement the techniques described herein independently or in parallel. In some examples, computing device(s) 104 can implement the entire techniques discussed herein. As such, the distributed computing resources 102 and/or computing device(s) 104 can include an enhanced communication throughput framework ("ECTF") 108 for implementing the techniques described herein.

In some examples, network(s) 106 can include public networks such as the Internet, private networks such as an institutional and/or personal intranet, or some combination of private and public networks. Network(s) 106 can also include any type of wired and/or wireless network, including but not limited to local area networks (LANs), wide area networks (WANs), satellite networks, cable networks, Wi-Fi networks, WiMax networks, mobile communications networks (e.g., 3G, 4G, and so forth) or any combination thereof. Network(s) 106 can utilize communication protocols, including packet-based and/or datagram-based protocols such as internet protocol (IP), transmission control protocol (TCP), user datagram protocol (UDP), and/or other types of protocols. Moreover, network(s) 106 can also include a number of devices that facilitate network communications and/or form a hardware basis for the networks, such as switches, routers, gateways, access points, firewalls, base stations, repeaters, backbone devices, and the like. In some examples, videos can be received for processing by the CG system via the network(s) 106. In some examples, the ECTF 108 can provision suggestions, as discussed herein, to other devices via the network(s) 106.

In some examples, example device 100 can include any type of computing device having one or more processing unit(s) 110 operably connected to computer-readable media 112. The connection can be via a bus 114, which in some instances can include one or more of a system bus, a data bus, an address bus, a PCI bus, a Mini-PCI bus, and any variety of local, peripheral, and/or independent buses, or via another operable connection. Processing unit(s) 110 can represent, for example, microprocessors, controllers or any other suitable type of processors for processing computer executable instructions to control the operation of the device in order to facilitate cross-channel communication. In some examples, where a system on a chip architecture is used, the processing unit(s) 110 can include one or more fixed function blocks (also referred to as accelerators) which implement a part of the method by employing the CG system in hardware (rather than software or firmware).

In some examples, distributed computing resource(s) 102 can include one or more computing devices that operate in a cluster and/or other grouped configuration to share resources, balance load, increase performance, provide failover support and/or redundancy, and/or for other purposes. Although illustrated as desktop computers, distributed computing resource(s) 102 and/or computing device(s) 104 can include a diverse variety of device types and are not limited to any particular type of device. For example, distributed computing resource(s) 102 can include any type of computing device having one or more processing unit(s) operably connected to computer-readable media, I/O interfaces(s), and/or network interface(s).

For example, example device 100 can include, but is not limited to, desktop computers, server computers, web-server computers, personal computers, mobile computers, laptop computers, tablet computers, wearable computers, implanted computing devices, telecommunication devices, automotive computers, network enabled televisions, thin clients, terminals, personal data assistants (PDAs), game consoles, gaming devices, work stations, media players, personal video recorders (PVRs), set-top boxes, cameras, integrated components for inclusion in a computing device, appliances, wearable device(s), smart vehicles, and/or any other sort of computing device such as one or more separate processor device(s), such as CPU-type processors (e.g., micro-processors), GPUs, and/or accelerator device(s).

As used herein, the computer-readable media 112 can include one or more of two types of computer-readable media, namely computer storage media and communication media. In some examples, the computer-readable media 112 is an example of storage media which can include volatile and non-volatile, non-transitory machine-readable, removable, and non-removable media implemented in any method or technology for storage of information (in compressed or uncompressed form), such as computer (or other electronic device) readable and/or executable instructions, data structures, program modules, and/or other data to perform processes or methods described herein. Computer storage media includes, but is not limited to hard drives, floppy diskettes, optical disks, CD-ROMs, DVDs, read-only memories (ROMs), random access memories (RAMS), EPROMs, EEPROMs, flash memory, magnetic and/or optical cards, solid-state memory devices, and/or other types of physical machine-readable media suitable for storing electronic instructions.

In contrast, in some examples, the computer-readable media 112 can include communication media which embodies computer-readable instructions, data structures, program modules, and/or other data in a modulated data signal, such as a carrier wave, and/or other transmission mechanism. As defined herein, computer storage media does not include communication media.

In some examples, as shown regarding device 100, computer-readable media 112 can store instructions readable and/or executable by the processing unit(s) 110. Executable instructions stored on computer-readable media 112 can include, for example, the ECTF 108 and other modules, programs, and/or applications that can be loadable and executable by processing unit(s) 110 (e.g., operating system 116, application(s) 118, firmware). In some examples, the ECTF 108 can include one or more modules to accomplish the techniques discussed herein. In some examples, the ECTF 108 can include a context capture module 120, a suggestion generator 122, a suggestion provisioner 124, and/or ECTF service(s) 126. In some examples, any number of modules could be employed and techniques described herein as employed by one or more modules can be employed by a greater or lesser number of modules. In some examples, the example device 100 can store, remotely access from another device, or make available, via the context capture module 120, the suggestion generator 122, the suggestion provisioner 124, and/or the ECTF service(s) 126. In some examples, the ECTF service(s) 126 can include the suggestion generator 112 and/or the suggestion provisioner 124. In some examples the ECTF service(s) 126 and the ECTF 108 can be configured on different devices and in communication via the network(s) 106.

In some examples, the context capture module 120 can configure the example device 100 to obtain and/or capture contextual data, according to any of the techniques discussed herein. In order to do so, the context capture module 120 can query the operating system 116, application(s) 118, the ECTF service(s) 126, and/or other devices via the network(s) 106 such as, in some examples, the distributed computing resource(s) 102. In some examples, the context capture module 120 can also utilize human-machine interface(s) 128 to obtain contextual data. In some examples, the human-machine interface(s) 128 can include or be communicatively connected, via network(s) 106 or an I/O interface for example, one or more of camera(s), microphone(s), speaker(s), display(s), tactile input/output device(s), network interface(s), input/output interface(s) and/or device(s), motion sensor(s), etc. In some examples, the context capture module 120 can use any of the components of the human-machine interface(s) 128 to obtain contextual data according to any of the techniques discussed herein. In some examples, an I/O interface of the human-machine interface(s) 128 can allow example device 100 to communicate with input/output devices such as user input devices including peripheral input devices (e.g., a keyboard, a mouse, a pen, a game controller, a voice input device, a touch input device, a gestural input device, gaze input, and the like) and/or output devices including peripheral output devices (e.g., a display, a printer, audio speakers, a haptic output, and the like).

In some examples, the suggestion generator 122 can include an audio-to-text conversion service, a video-to-audio and/or image conversion service, a vision service, and/or a natural language processing service in order to generate predicted words, identify words from which to generate other words and/or phrases, and/or generate predicted phrases. In some examples, the services of the suggestion generator 124 can be available to the ECTF 108 via application programming interfaces ("APIs"). In some examples, the suggestion generator 122 can include heuristic phrases into which the suggestion generator 122 inserts generated words. In some examples, the suggestion generator 122 can start with a set of heuristic phrases which the suggestion generator 122 can augment using machine learning (e.g., by a deep learning network, Naïve Bayes classifier, directed graph) using data regarding the suggestion selection activity and/or utterance patterns of one or more users (e.g., by accessing past utterances of a user, by accessing past utterances and/or selections of a multiplicity of users stored on a cloud service). In some examples, the suggestion generator 122 can include human services (e.g., providing via network interface(s) 130 contextual data and/or generated words to a human for suggestion generation).

In some examples, the suggestion generator 124 can receive contextual data such as, for example, video, audio, images, and/or text from the ECTF 108 and the suggestion generator 124 can predict words that may have a propensity to effect utterances of a use from the contextual data. In some examples, the suggestion generator 112 can query the ECTF service(s) 126 to obtain, from contextual data received from the ECTF 108, predicted words that may have a propensity to effect utterances of a user (e.g., when contextual data requires cleaning or parsing to identify salient portions, contextual data that includes more than video, audio, and/or images).

In some examples, the suggestion generator 122 can use predicted words to generate predicted phrases or the suggestion generator 122 can query the ECTF service(s) 126 to obtain the predicted phrases. In some examples, the suggestion generator 122 and/or the ECTF service(s) 126 can include a natural language processing to generate predicted phrases and/or to identify from text (e.g., text converted from video, audio, images, application data, operating system data, etc.) potentially salient words and/or to generate weights for predicted words and/or predicted phrases. In some examples In some examples, the suggestion provisioner 124, can provide suggestions (i.e., one or more predicted words and/or phrases) to a user in a suitable matter for the user to select from the suggestions. In some examples, the suggestion provisioner 124 can include instructions for a GUI to represent the suggestions via the human-machine interface(s) 128, as discussed in regards to FIG. 3-FIG. 8. In some examples, the GUI can include a superimposition of the suggestions over a reproduction of an image. In some examples, the suggestions can be superimposed over salient objects in the image to which the suggestions correspond. In some examples, the GUI can include a keyboard. In some examples, the GUI can include an area devoted to the suggestions. In some examples, this area can be an area occupied by a keyboard representation and/or another area of a display. In some examples, the suggestions can be represented as text entry completions (e.g., if a user selects "p", the suggestions can include completions such as, for example, "paper pad" or "please bring me the paper pad").

In some examples, the suggestion provisioner 124 can be configured to provide whole word suggestions, phrase suggestions, word auto-completion suggestions, and/or automatic spelling correction suggestions, etc. In some examples, the suggestion provisioner 124 can calculate a statistical probability for a candidate word that the user is trying to input (i.e., the suggestion provisioner 124 can try to anticipate a word that a user is trying to enter). In some examples, the suggestion provisioner 124 can calculate this probability for ambiguous or error-prone keyboards such as shapewriting and/or other gesture and/or swipe-based techniques, etc.

In some examples, the suggestion provisioner 124 can be configured to receive a selection by the user of one of the suggestions presented to the user. In some examples, this includes receiving information from the human-machine interface 128 such as, for example, gaze data, tactile data, input/output device data (e.g., forehead mouse, button actuation data, pointer device data), camera data, user motion data, and/or auditory data that the suggestion provisioner 124 can correlate as a selection of one of the suggestions. In some examples, a user can select one of the suggestions using "gaze selecting". For example, to gaze select, a user can linger the user's gaze on one of the suggestions for a predetermined amount of time in order to select the suggestion.

In some examples, the suggestion provisioner 124 can be configured to provision a selected suggestion as output. In some examples, the suggestion provisioner 124 can format the selected suggestion to accord with a selected output (e.g., selected by the user, selected by a settings designation, selected by a detection of an environment identifier, for example, output to audio for an environment identifier of "home" and/or output to text for environment identifier of "text messaging"). In some examples, the suggestion provisioner 124 can provision the selected suggestion as output to one or more of operating system 116, one or more application(s) 118, the human-machine interface(s) 128, or the network interface(s) 130 (e.g., for provision to a device connected to the example device 100 by a network). As discussed above, the human-machine interface(s) 128 can include one or more components such as, for example, camera(s), microphone(s), speaker(s), display(s), tactile input/output device(s), network interface(s), input/output interfaces) and/or device(s), motion sensor(s), etc.

In some examples, the ECTF service(s) 126 can include an environment detection service, suggestion generator 122 (e.g., when the ECTF service(s) 126 are configured on a second device), a natural language processing service, and/or a vision service. In some examples, the ECTF service(s) 126 can be remotely accessible to the example device 100 via a network. In some examples, the environment detection service can include machine learning (e.g., a classifier, deep learning model, convolutional deep neural network) that takes contextual data as an input and outputs an environment identifier based at least in part on co-occurrence(s) of one or more discrete elements of contextual data. For example, if the contextual data includes the salient object labels, "Onion," "Knife," "Spoon," "Table," "Sink," "Mixing Bowl," and "Spouse," the environment detection service can concatenate an environmental identifier such as, for example, "home" or "kitchen" to the contextual data. Or, in another example, if the contextual data includes application data such as a calendar event including the term "concert" and a time of 8:00 PM, operating system data that includes a tie of 8:17 PM, and captured audio that includes loud music, the environment detection service can concatenate an environmental identifier such as, for example, "concert" or "noisy surroundings". In some examples, environmental identifiers such as "noisy surroundings" can be used by the suggestion provisioner 124 to select a form of output (e.g., for "noisy surroundings", the suggestion provision 124 can choose to not Output selected suggestions to a speaker of the human-machine interface(s) 128 and could instead output selected suggestions to a display of the human-machine interface(s) 128 for example). In some examples, the contextual data can be processed by another service such as, for example, a vision service and/or a natural language processing service, before the contextual data is provided to the environment detection service.

In some examples, a natural language processing service of the ECTF service(s) 126 can process the contextual data to identify potentially portions to provide to a service to generate predicted words and/or phrases, to generate the predicted words and/or phrases itself, and/or to clean or otherwise prepare the contextual data for provision to other portions of the techniques discussed herein. In some examples, the natural language processing service can include machine learning components such as, for example, deep learning neural network, convolutional neural networks, directed acyclic graphs, classifiers, etc. In some examples, the natural language processing service of the ECTF service(s) 126 (and/or the suggestion generator 124) can generate weights for contextual data provided for generation of predicted words and/or phrases and/or weights for generated predicted words and/or phrases. In some examples the ECTF service(s) 126 (and/or the suggestion generator 124) can additionally or alternatively sort, rank, and/or filter the generated words and/or phrases based at least in part on contextual data.

In some examples, the computer-readable media 112 can also include a data store 132. In some examples, data store 132 includes data storage such as a database, data warehouse, and/or other type of structured or unstructured data storage. In some examples, the data store 132 can include application data, operating system data, previous utterances of a user or another person detected by the human-machine interface 128, and/or previous selections of suggestions.

Example device 100 can also include network interface(s) 130 to enable communications over network(s) 106. Such network interface(s) 106 can include one or more network interface controllers (NICs) or other types of transceiver devices to send and receive communications over a network 106.

Example Environment

Figure 2:
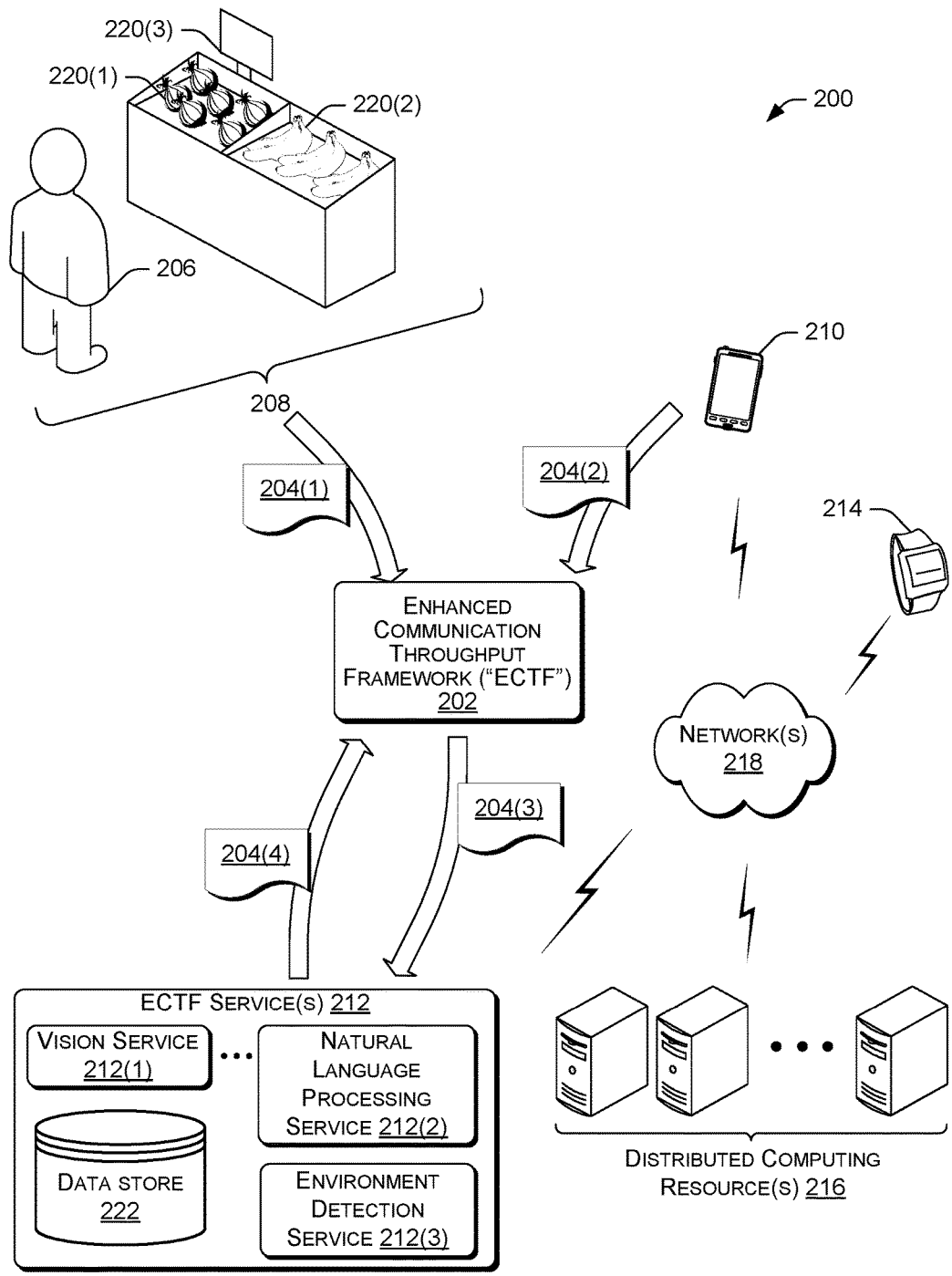
FIG. 2 is a block diagram depicting an example environment in which the techniques to enhance communication throughput by leveraging an environmental context can be implemented.

FIG. 2 is a block diagram depicting an example environment 200 in which the techniques discussed herein can operate.

The example environment 200 includes an enhanced communication throughput framework ("ECTF") 202, which can represent ECTF 108, that leverages contextual data 204(1)-(4) that the ECTF 202 obtains from one or more sources, in some examples, to enhance communication throughput for a user 206. FIG. 2 illustrates the ECTF 202 independently of a device although it is understood that the ECTF 202 can be configured on any device as discussed above in regard to example device 100. In some examples, the ECTF 202 can obtain one or more of contextual data 204(1) from surroundings 208 of the user 206 of the techniques, contextual data 204(2) from device(s) 210, contextual data 204(3) that the ECTF 202 captures or has otherwise obtained, or contextual data 204(4) from ECTF service(s) 212, which can represent ECTF service(s) 126. In some examples, such as the one illustrated in FIG. 2 the ECTF service(s) 212 can be configured on a disparate device from the device upon which the ECTF 202 is configured. In some examples, the ECTF 202 can be configured on the device(s) 210 and the ECTF service(s) 212 can be configured on distributed computing resource(s) 216.

In some examples, the ECTF 202 can be communicatively coupled to a human-machine interface such that the ECTF 202 can provide suggestions to a user for selection, receive selections of suggestions from the user, and/or provision suggestions to the human-machine interface for output on behalf of the user. In some examples, the ECTF 202 can provision the suggestions to one or more of another device, such as device 214 which can represent an example device 100, over the network(s) 218; an application stored on a same device on which the ECTF 202 is configured, etc.

In some examples, the contextual data 204(1) can include contextual data regarding the physical surroundings of a user such as, for example, one or more of:
    an image of the surroundings 208 of the user 206;
    salient object identifiers of salient objects 220(1)-(3) (e.g., an onion 220(1), a banana 220(2), a sale sign 220(3));
    a location of the surroundings 208 (e.g., coordinates);

an environment identifier corresponding to the surroundings 208 (e.g., "grocery store"); audio and/or video captured from the surroundings 208;

utterances detected from the image, audio, and/or video captured from the surroundings 208 (e.g., utterances from nearby persons, utterances of the device 210, utterances of the user 206, textual utterances such as text of the sale sign 220(3));

an activity identifier of the user (e.g., user is "walking", user is "standing", user is "fallen");

etc.

In some examples, the device 210 can capture or obtain a portion of the contextual data 204(1).

In some examples, the contextual data 204(2) can include contextual data obtained from the device 210. In some examples, the contextual data 204(2) can include one or more of:

application data obtained from an application (e.g., previous utterances submitted to the application, selections of portions of the application for input, an active portion of the application, a purpose or function of the application, application use history, application requests, stored application data such as calendar events, photos, or geo-locations) or by querying the operating system regarding the application (e.g., an up-time for the application, a purpose of the application, portions of a register accessed by the application);

operation system information or information provided by the operation system (e.g., a time of day, device and/or software information);

a location of the device 210 (e.g., a geo-location corresponding to an IP address of the device 210, a GPS location of the device 210);

an utterance output destination or purpose (e.g., selection of a field, selection of an option for display, audio replication, and/or transmission, such as via a text-messaging service, entry as an Internet search);

etc.

In some examples, the contextual data 204(3) can include a subset of the contextual data 204(1), (2), and/or (4) that the ECTF 202 has identified as being potentially salient for prediction (e.g., by conducting natural language processing and/or classification on the contextual data). In some examples, the ECTF 202 can provide the contextual data 204(1) and (2) to the ECTF service(s) 212 to generate predicted words and/or phrases. In some examples, the ECTF service(s) include one or more of vision service 212(1), natural language processing service 212(2), environment detection service 2143), and any of the other services discussed herein. In some examples, the ECTF service(s) 212 can also include data store 222. In some examples, the data store 222 can include data from other users of the techniques discussed herein. For example, the data store 222 can include utterances, suggestions, suggestion selections, other contextual data etc. of other users that the ECTF service(s) can use to train the services that compose the ECTF service(s) 212 such as, for example, the vision service 212(1), the natural language processing service 212(2), and/or the environment detection service 212(3).

In some examples, contextual data 204(4) can include one or more of predicted words and/or phrases, environment identifiers, salient object identifiers, prior suggestion selections, prior utterances (whether of the user or another individual), etc.

Example Scenarios

Figure 3:
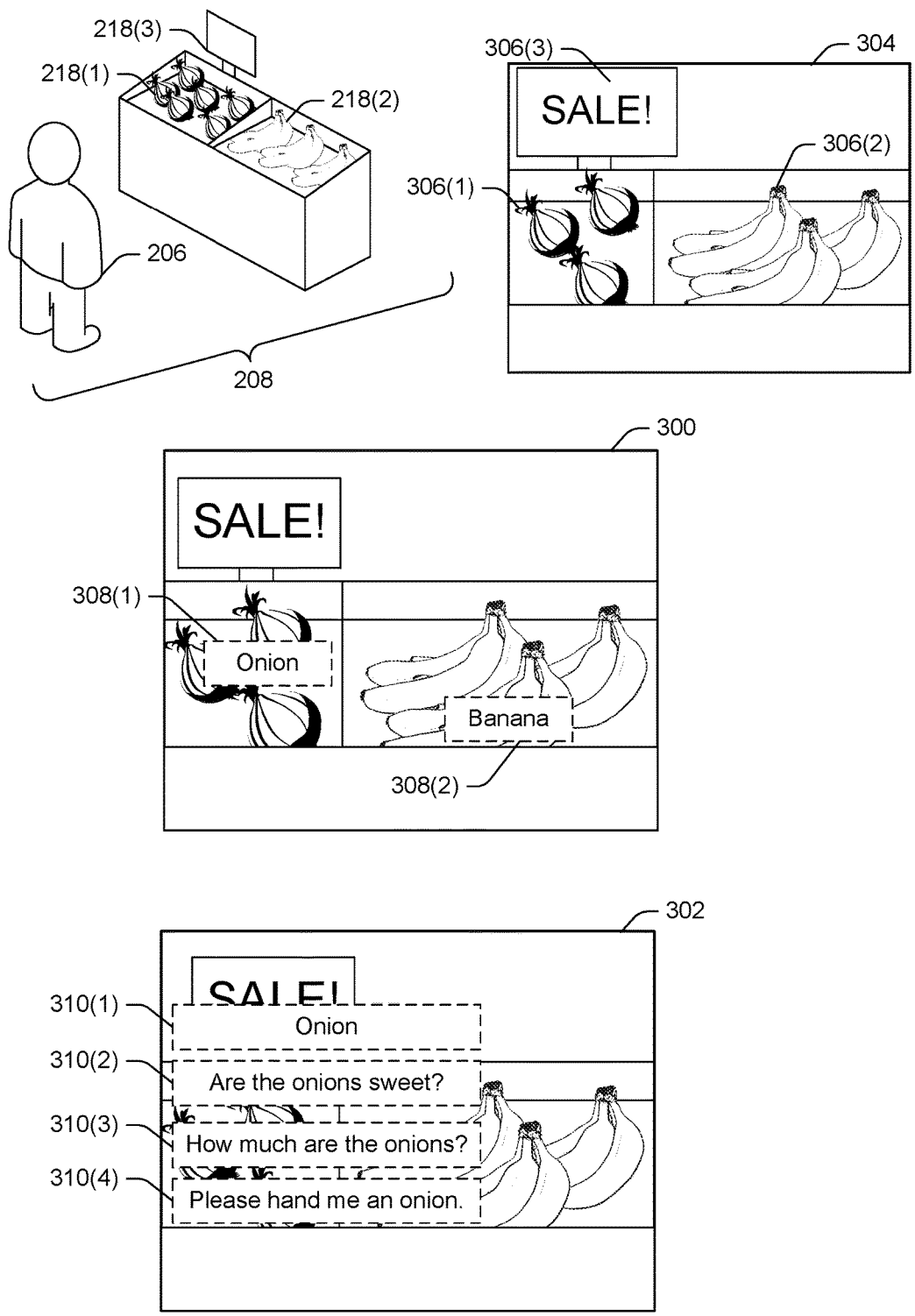
FIG. 3 includes example user interfaces provisioning word and/or phrase suggestions to a user for the user's selection and for output on the user's behalf.

FIG. 3 depicts example graphical user interfaces ("GUIs") 300 and 302 for representing word and/or phrase suggestions to a user 206 to expedite communication throughput for the user 206. In this example, the techniques can output a selected suggestion according to any technique discussed herein. Element 304 is a representation of an image 304 of the surroundings 208 of the user 206. In some examples, the image 304 can include salient objects 306(1) (i.e., onion(s)), 306(2) (i.e., banana(s)), and 306(3) (i.e., sale sign) identified according to any of the techniques discussed herein. In some examples, the techniques discussed herein can identify groups of salient objects (i.e., onions) and/or individual salient objects when multiple salient objects of the same kind are present (i.e., onion).

In some examples, the GUI 300 can include representations of predicted words (i.e., "onion" and "banana" in this example) such as, for example, superimposed labels 308(1) and 308(2), as FIG. 3 depicts. In some examples, the predicted words 308(1) and (2) can be derived from the salient object labels. The GUI 300 depicted in FIG. 3 also demonstrates an instance of weighting, sorting, ranking, and/or filtering that results in less than all the possible predicted words being displayed (i.e., only "onion" and "banana" are displayed even though "sale sign" can be another predicted word). The techniques discussed herein can use one or more of weighting, sorting, ranking, or filtering to decide to display predicted words corresponding to only two of the detected salient objects instead of three. For example, the weighting, sorting, ranking, and/or filtering can be based on contextual data that suggests that a user is interested in commercial or grocery items (e.g., from former utterances of a user, from average gaze data, from user input), natural language processing that detects that "onion" and "banana" are more often a topic of utterances, machine learning based on previous utterances and/or suggestion selections of one or more users that identifies "onion" and "banana" as being more likely to be selected.

In some examples, the GUI 302 can further include a predicted word and predicted phrases as superimposed labels 310(1)-(4) in the GUI 302. In some examples, a GUI 302 can be presented to the user 206 responsive to reception of a selection of the superimposed label 308(1) (e.g., selection of a representation of a predicted word can initiate generation of phrases, selection of a representation of a predicted word can initiate presentation of more suggestions related to the predicted word). In some examples, the GUI 302 can be the first GUI presented based at least in part on weighting, sorting, ranking, or filtering based at least in part on contextual data. For example, the techniques discussed herein could identify from an application that the user 206 had previously uttered via a text message, "Do we need onions?", or a person in the surroundings 208 could have uttered, "I think we need onions", which the techniques can detect via a microphone and audio-to-text conversion.

In some examples, natural language processing can determine phrases that are likely to be associated with a predicted word and/or salient object label. For example, a natural language processing service could determine that a common interrogatory regarding onions is whether or not they are sweet, as superimposed label 310(2) reflects. In some examples, the natural language processing service can leverage data regarding previous utterances and/or suggestion selections of one or more users to make such a determination.

In some examples, even though a label is not provided that corresponds to the salient object label (or predicted word, in some examples) "sale sign," "sale sign" can be used to predict phrases that are related to "sale sign". For example, superimposed label 310(3) can be a representation of a phrase predicted from contextual data that includes the salient object labels "onion" and "sale sign". In some examples, an environment detection service can detect, from contextual data such as the salient object labels "onion", "banana" and "sale sign", that an environment identifier of "grocery store" can be included in the contextual data. In some examples, this environment identifier can be used to generate predicted phrases such as the predicted phrase represented by superimposed label 310(2), which may be more likely to be asked in a grocery store as opposed to environment such as "home".

In some examples, the GUI 302 can include representations of predicted phrases that are generated based on heuristics such as, for example, the predicted phrase represented by superimposed label 310(4). In some examples, a heuristic phrase can include phrases such as "Please hand me _____", for example. In some examples, the techniques herein can use the weighting, sorting, ranking, and/or filtering of contextual data to determine what source of phrase generation to use (e.g., natural language processing, heuristic phrases, live human-generated phrases) and/or what form the phrase should take (e.g., a sentence completion, an interrogatory, a qualitative statement).

Figure 4:
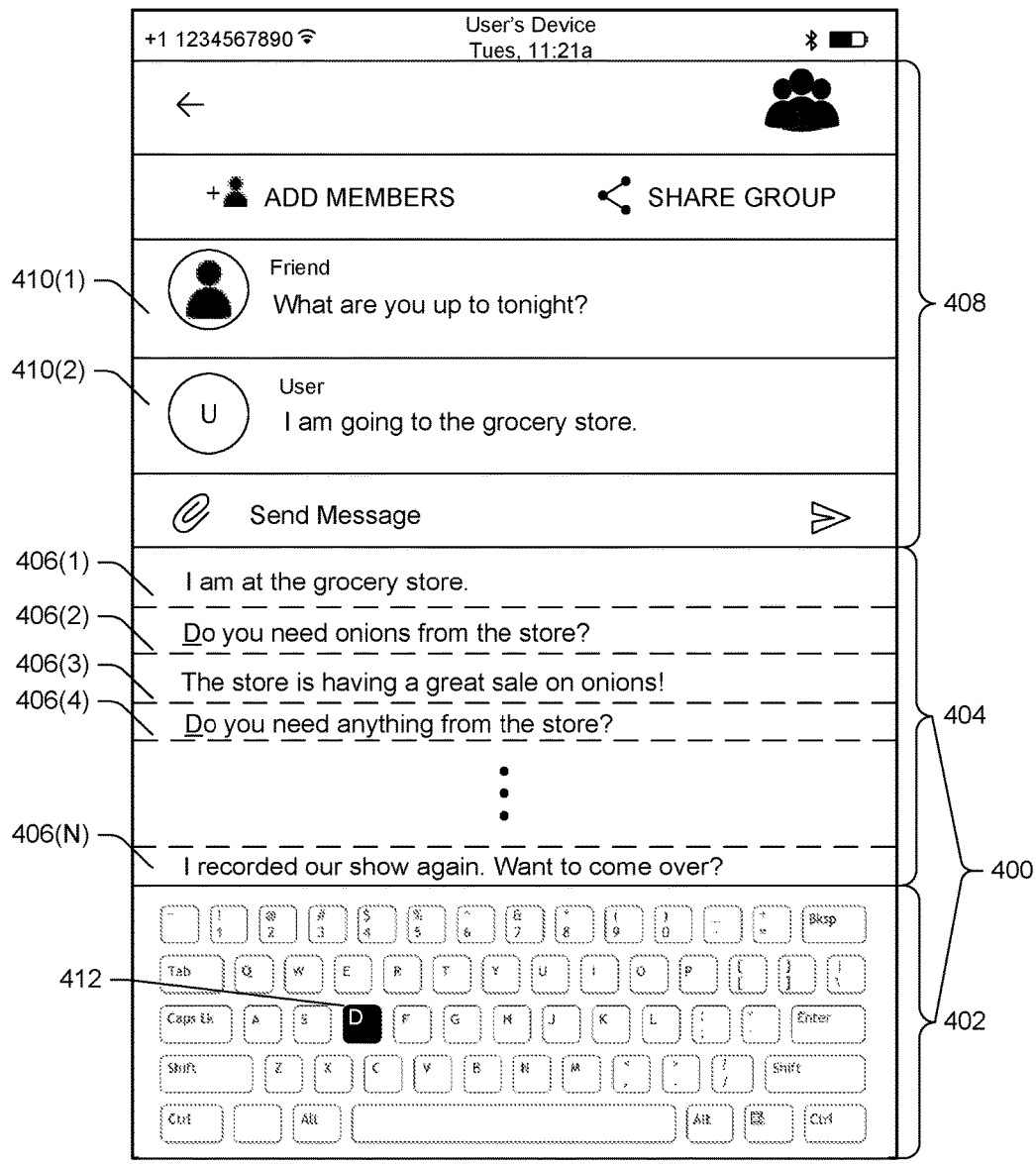
FIG. 4 is an example user interface that includes a keyboard and suggestion area for enhancing a user's communication throughput.

FIG. 4 depicts example GUI 400 for representing word and/or phrase suggestions to expedite communication throughput. In some examples the GUI 400 can include a keyboard representation 402 and an area 404 for presenting suggestions 406(1)-(N). FIG. 4 also depicts an example of outputting selected utterances to an application and/or a network interface (the application can include a GUI represented in FIG. 4 by GUI 408). In some examples, the application can be a messaging service such as the one represented by the GUI 408. In some examples, contextual data can include previous utterances received from application data such as, for example, previous utterances 410(1) (e.g., of a different person, as in FIG. 4) and 410(2) (e.g., of the user, as in FIG. 4. In some examples, previous utterances 410(2) can be a previous suggestion selection of the user.

In some examples, the area 404 of the GUI 400 can include an N number of spaces for representing suggestions. In some examples, the techniques discussed herein can leverage contextual data to weight, sort, rank, and/or filter the suggestions to reduce a number of the suggestions greater than N to N suggestions. In some examples, the techniques herein can include providing an option to the user to view more suggestions. In that example, the GUI 400 can refresh the suggestions 406 with another N suggestions according to the weighting, sorting, ranking, and/or filtering. In some examples, as FIG. 4 illustrates, the contextual data can include a selection 412 (i.e., selection of a representation of the letter "D") of a portion of the keyboard 402. The example suggestions depicted in FIG. 4 include suggestions that appear as a result of using this selection 412 (which can be part of context data obtained by the techniques described herein) to weight, sort, rank, and/or filter generated suggestions. For example, suggestions such as suggestion 406(2) and 406(4) can be sentence completions that start a same letter (or letter combination in some examples). In some examples, the keyboard selection 412 can otherwise be used to weight, sort, rank, and/or filter generated suggestions.

FIG. 4 also includes an example of suggestions ranked by relatedness to surroundings of a user from most related to the surroundings (i.e., suggestion 406(1) when an environment identifier and/or a salient object label includes "grocery store") to not related to the surroundings (i.e., suggestion 406(N)). FIG. 4 also depicts a suggestion 406(N) that can be generated based at least in part on contextual data such as, for example, application data and/or previous utterances, for example.

In some examples, in the scenario depicted in FIG. 4, when the user selects a suggestion, the suggestion can be output to the application and represented in the GUI 408. In some examples, the selection can be subsequently treated as contextual data.

Figure 5:
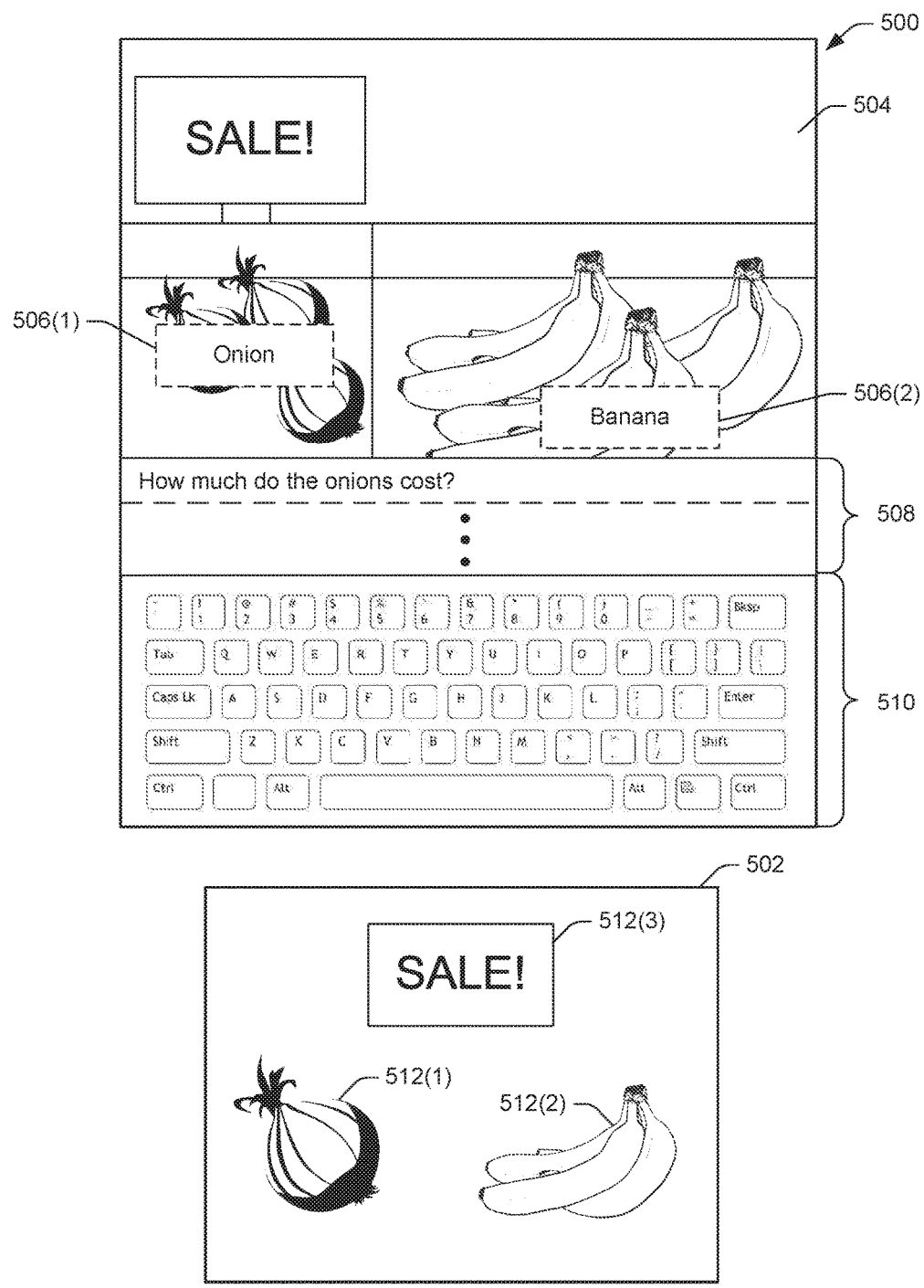
FIG. 5 includes example user interfaces for provisioning word and/or phrase suggestions to a user for the user's selection and for output on the user's behalf.

FIG. 5 depicts example GUIs 500 and 502 for representing word and/or phrase suggestions to expedite communication throughput. GUI 500 is a hybrid GUI that includes an image 504 of surroundings, superimposed labels 506(1) and 506(2), a suggestion area 508, and a keyboard 510. In some examples, a GUI included a suggestion area and a keyboard can be used any time an application or the operating system calls for a keyboard.

In some examples, instead of letter representations, the keyboard can include salient object representations such as, for example, representations 512(1)-(3) of GUI 502. In some examples, GUI 502 can include salient object representations such as, for example, representations 512(1)-(3). In some examples, the decision to represent suggestions in this manner can be based at least in part on a setting corresponding to a cognitive capability of a user of the system.

Figure 6:
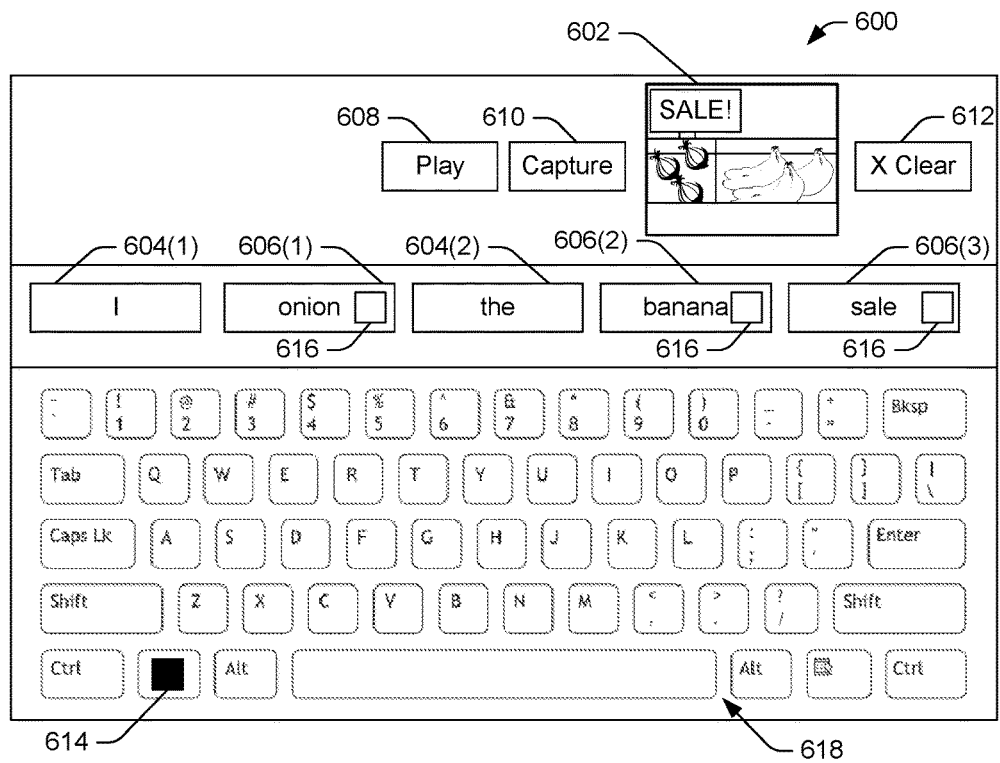
FIG. 6 illustrates an example user interface for representing word and/or phrase suggestions to expedite communication throughput.

FIG. 6 depicts example GUI 600 for representing word suggestions to expedite communication throughput. Example GUI 600 can include, for example, a representation 602 of an image and/or a video (or other environmental context data); word suggestions 604(1) and (2) generated by a statistical language model such as, for example, a natural language processing service accessible via an API; and word suggestions 606(1)-(3) generated based at least in part on an environmental context (e.g., the image and/or video represented by representation 602). In some examples, the representation 602 need not be displayed. In some examples, the GUI 600 can include a play button 608 (i.e., to review enviromnental context data), a capture button 610 (i.e., to initiate capture of environmental context data), and/or a clear button 612 (i.e., to remove environmental context data) or any other button for initiating capture of an environmental context, reviewing environmental context data, selecting environmental context data, specifying a portion of an environmental context that is desired to generate suggestions, etc.

In some examples, the GUI 600 can include a toggle button 614 to toggle the appearance of context-based suggestions. In some examples, the toggle button 614 can toggle through options including one or more of context-based suggestions on, context-based suggestions off, context-based suggestions only, top-k context-based suggestions, etc. In some examples, a suggestion can include an indicator 616 that the suggestion was generated using environmental context data. In some examples, the indicator 616 can include one or more of a color of the suggestion, a visual indicator (e.g., a star, a symbol), or text effects (e.g., text color, italics, underlining, holding, font size, etc.). In some examples, the GUI 600 can include a user input interface such as, for example, a keyboard 618, as depicted.

Figure 7:
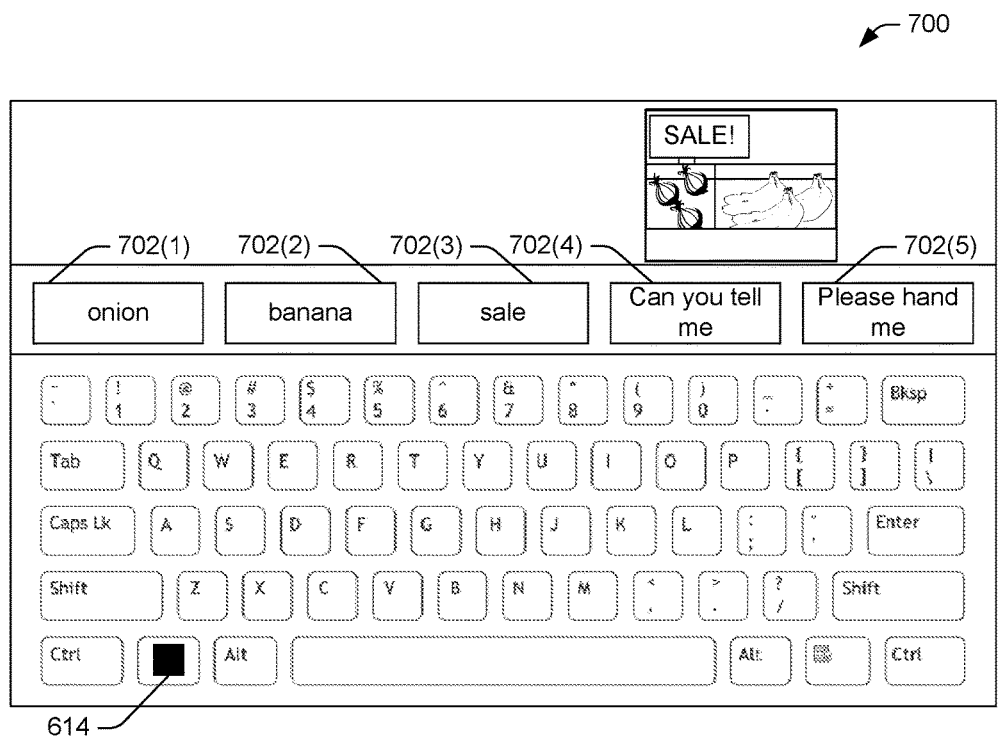
FIG. 7 illustrates an example user interface for representing word and/or suggestions to expedite communication throughput.

FIG. 7 depicts example GUI 700 for representing word and/or phrase suggestions 702(1)-(5) to expedite communication throughput. In some examples, the GUI 700 depicted in FIG. 7 can include only environmental context generated suggestions. In some examples, the GUI 700 can include only environmental context generated suggestions by selecting the toggle button 614, such as when the GUI is in a state similar to the state of the GUI depicted in FIG. 6. In some examples, the word suggestions and phrase suggestions can be organized by type, as depicted in FIG. 7 (i.e., word suggestions 702(1)-(3) are group together and to the left and phrase suggestions 702(4) and (5) are grouped together and to the right). Although the suggestions are depicted in this manner, it is understood that weighting, sorting, ranking, and/or filtering can be used to effect this ordering.

Figure 8:
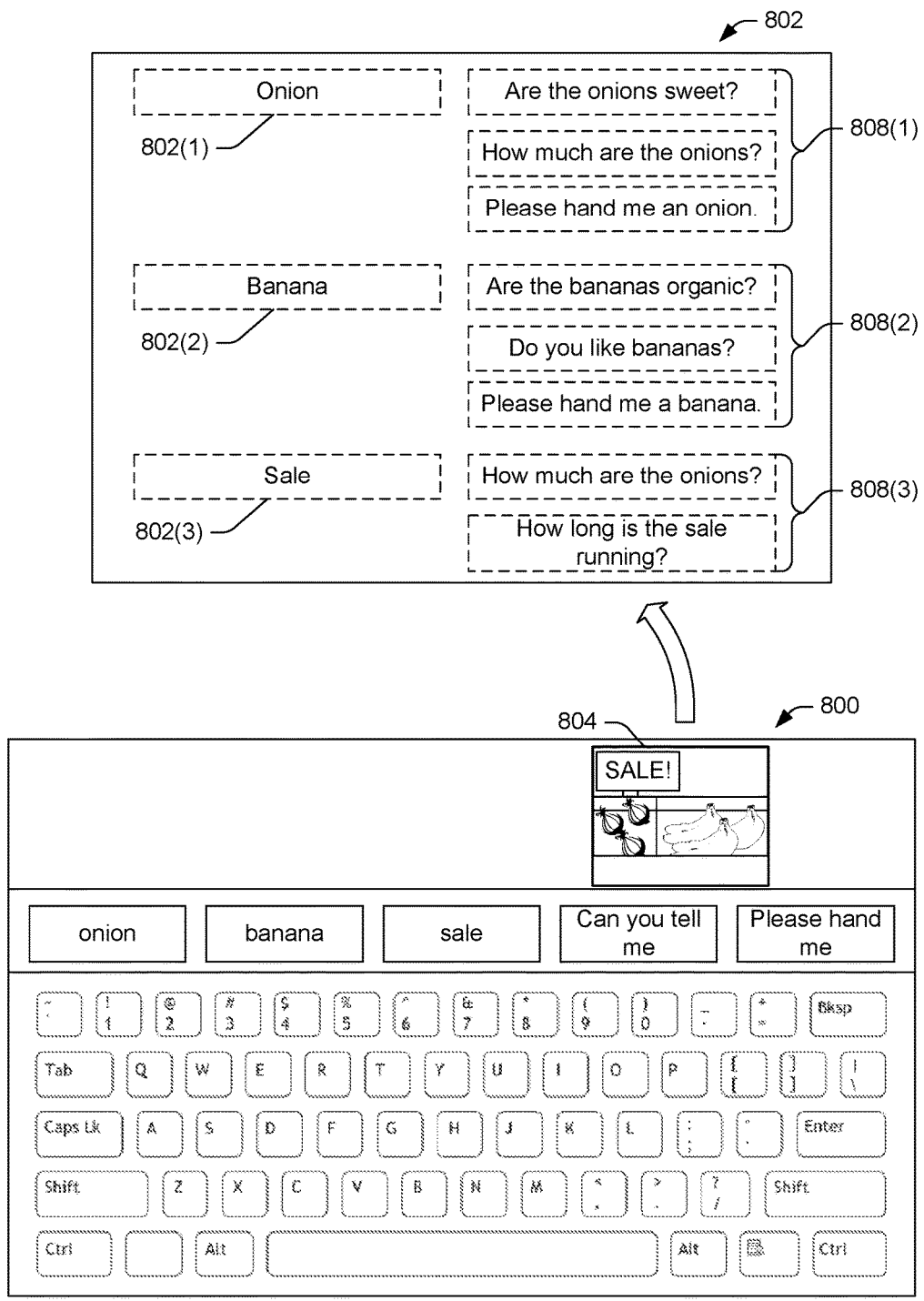
FIG. 8 illustrates an example user interface and an example dedicated user interface for representing word and/or phrase suggestions to expedite communication throughput.

FIG. 8 depicts example GUI 800 and example dedicated GUI 802. In some examples a representation 804 of an image and/or video (or other environmental context data) can be selected to transition between GUI 800 and dedicated GUI 802. In some examples, any of the GUIs described herein and/or the GUI 802 can be implemented on a device that is dedicated to environmental contextual communication. In some examples, the dedicated GUI 802 can include word suggestions 806(1)-(3) and/or phrase suggestions 808(1)-(3). In some examples, for ease of use, the dedicated. GUI 800 can be arranged to display a type of the suggestion in a same or similar location within the dedicated GUI 800. For example, the dedicated GUI 800 could place word suggestions on the left and phrase suggestions on the right, as depicted; or the dedicated GUI 800 could place similarly generated suggestions in a similar location in the GUI (e.g., the phrases generated from the heuristic phrase "Please hand me a(n) _____" appear in a similar location in the dedicated GUI 800—see the similarity respective location of "Please hand me an onion" and "Please hand me a banana" within the dedicated GUI 800).

In some examples, the GUI can locate the suggestions in the GUI-space based at least in part on relatedness between the suggestions. For example, in another example, the phrase suggestion, "How much are the onions?" could be located more proximately to the word suggestion 802(3), "Sale" or phrase suggestions 808(3) related to the word suggestion 802(3), "Sale". Although the GUIs depicted herein depict the suggestions as rectangular visual elements, it is contemplated that other visual representation methods can be employed and/or other sensory outputs can be utilized additionally or alternatively such as, for example, audio, tactile, or brain wave output.

Example Processes

Figure 9:
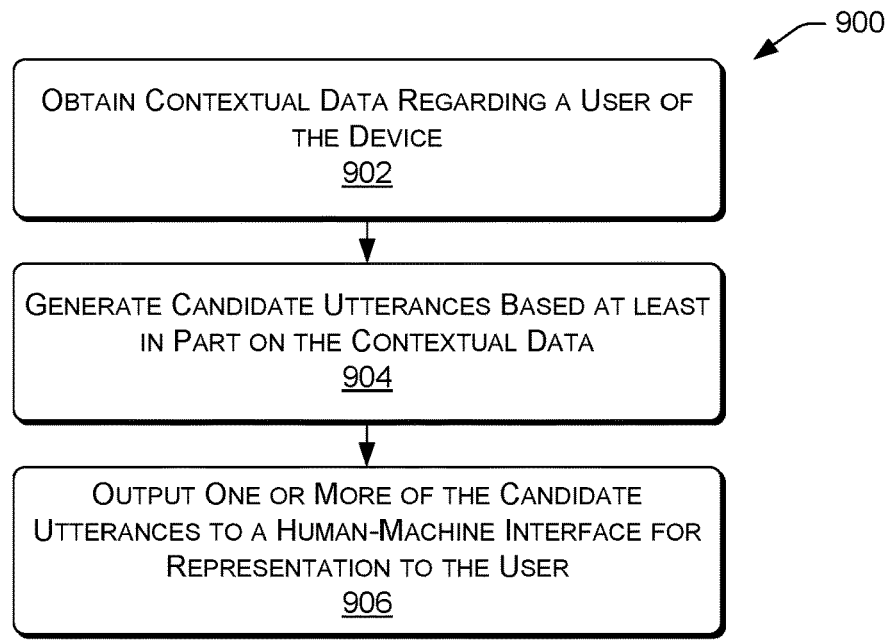
FIG. 9 is a flow diagram illustrating an example process for enhancing communication throughput for a user based at least in part on leveraging contextual data.
Figure 10:
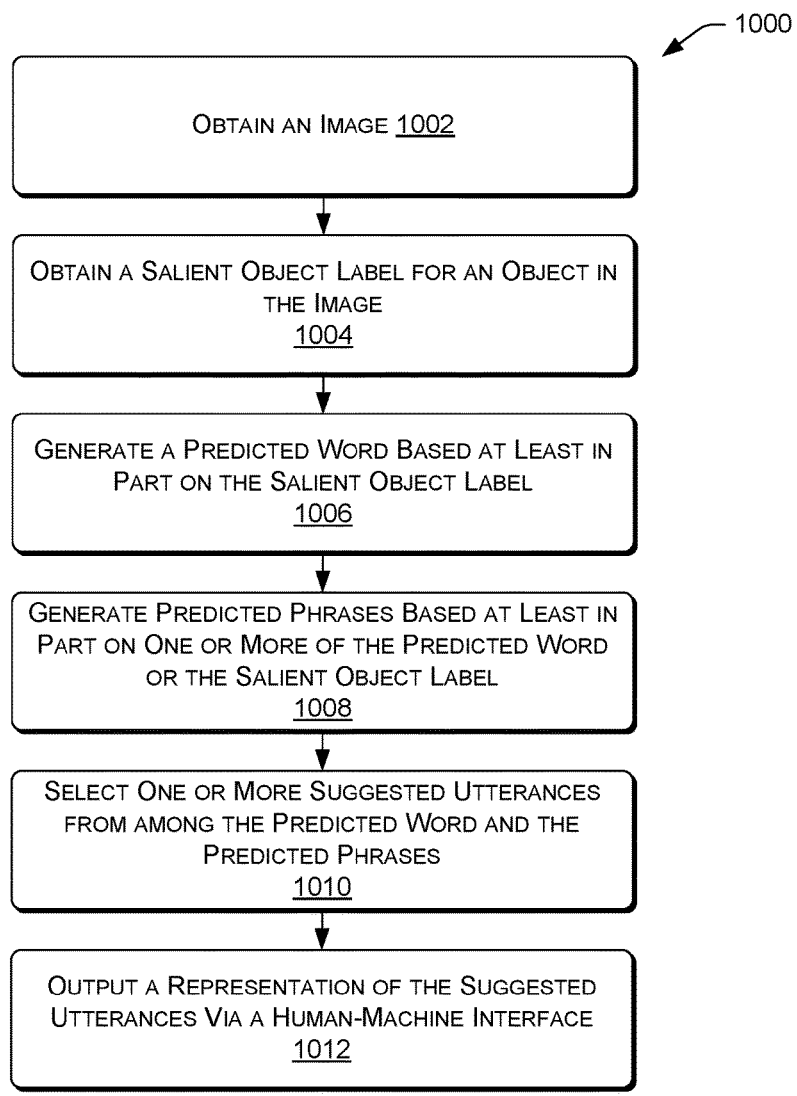
FIG. 10 is a flow diagram illustrating an example process for enhancing communication throughput for a user based at least in part on leveraging contextual data including an image.
Figure 11:
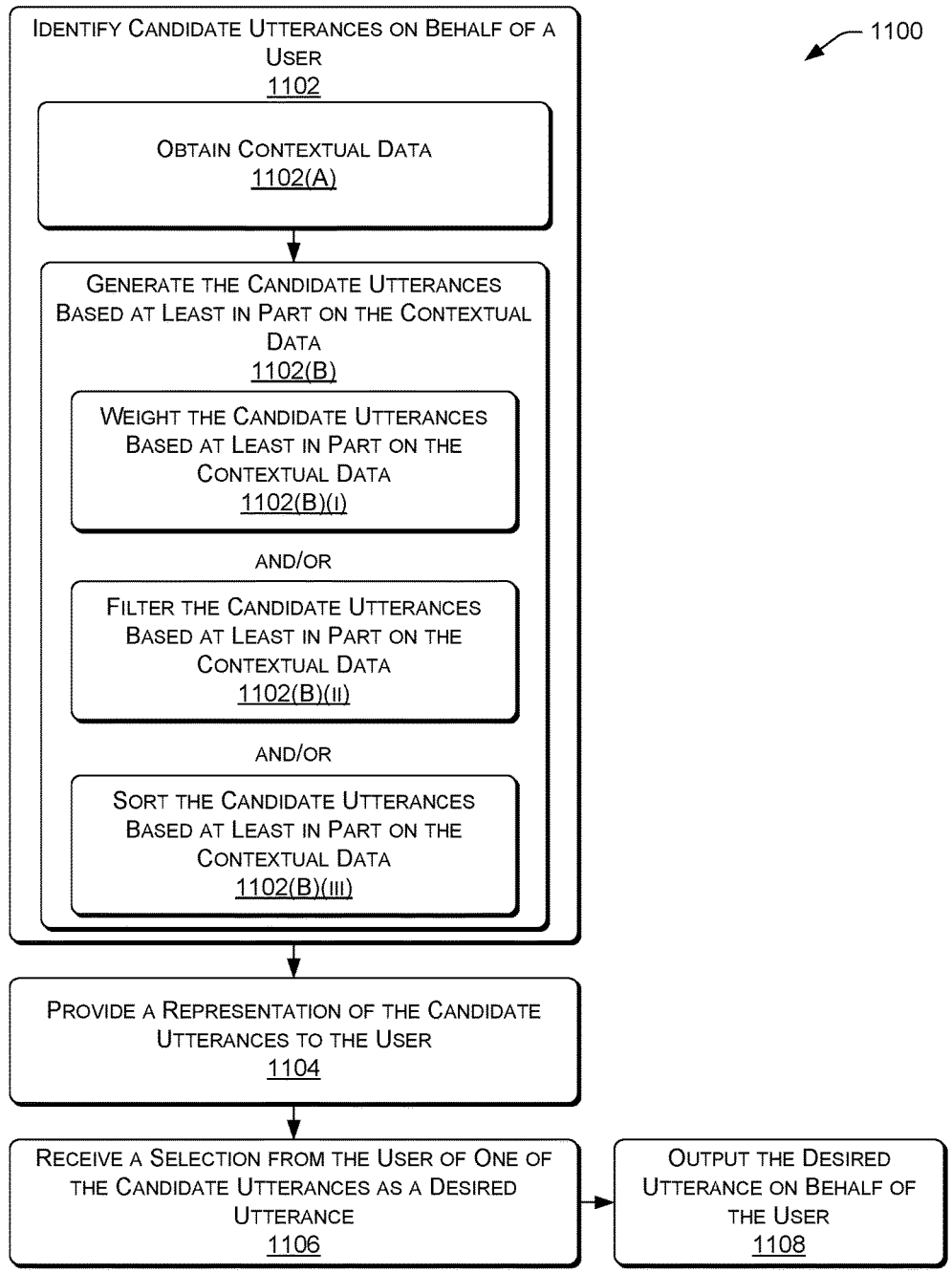
FIG. 11 is a flow diagram illustrating an example process for enhancing communication throughput for a user based at least in part on identifying candidate utterances on behalf of a user using contextual data.

FIG. 9-FIG. 11 illustrate example processes 900, 1000, and 1100, which can be performed in whole or in part. These processes can, but need not be, performed in the using the example device 100 of FIG. 1.

FIG. 9 depicts an example process 900 for enhancing communication throughput for a user based at least in part on leveraging contextual data.

At 902, ECTF 108 can obtain contextual data regarding a user of a device, the contextual data including data that may have a propensity to influence utterances of the user, according to any of techniques discussed herein.

At 904, ECTF 108 can generate candidate utterances based at least in part on the contextual data, according to any of techniques discussed herein.

At 906, ECTF 108 can provision one or more of the candidate utterances to a human-machine interface for representation to the user, according to any of techniques discussed herein.

FIG. 10 depicts an example process 1000 for enhancing communication throughput for a user based at least in part on leveraging contextual data including an image.

At 1002, ECTF 108 can obtain an image, according to any of techniques discussed herein. In some examples, the image can be of the surroundings of a user. In some examples, the image can be otherwise captured or retrieved.

At 1004, ECTF 108 can obtain a salient object label for an object in the image, according to any of techniques discussed herein. In so At 1006, ECTF 108 can generate a predicted word based at least in part on the salient object label, according to any of techniques discussed herein.

At 1008, ECTF 108 can generate predicted phrases based at least in part on one or more of the predicted word or the salient object label, according to any of techniques discussed herein.

At 1010, ECTF 108 can select a subset including one or more of the predicted word or predicted phrases, according to any of techniques discussed herein. In some examples, the selection includes one or more of weighting, sorting, ranking, and/or filtering based at least in part on contextual data.

At 1012, ECTF 108 can select a subset including one or more of the predicted word or predicted phrases, according to any of techniques discussed herein.

At 1008, ECTF 108 can provide, as suggested utterances, a representation of the subset via a human-machine interface, according to any of the techniques discussed herein.

FIG. 11 depicts an example process 1100 for enhancing communication throughput for a user based at least in part on identifying candidate utterances on behalf of a user using contextual data.

At 1102, ECTF 108 can identify candidate utterances on behalf of a user. In some examples, operation 802 can include one or more of: operations 802(A) and 802(B).

At 1102(A), ECTF 108 can obtain contextual data, according to any of techniques discussed herein.

At 1102(B), ECTF 108 can generate the candidate utterances based at least in part on the contextual data, according to any of techniques discussed herein. In some examples, operation 1102(B) can include one or more of: operation 1102(B)(i), weighting the candidate utterances based at least in part on the contextual data, according to any of techniques discussed herein; operation 1102(B)(ii), filtering the candidate utterances based at least in part on the contextual data, according to any of techniques discussed herein; or operation 1102(B)(iii), sorting the candidate utterances based at least in part on the contextual data, according to any of techniques discussed herein.

At 1104, ECTF 108 can provide a representation of the candidate utterances to the user, according to any of techniques discussed herein.

At 1106, ECTF 108 can receive a selection from the user of one of the candidate utterances as a desired utterance, according to any of techniques discussed herein.

At 1108, ECTF 108 can output the desired utterance on behalf of the user, according to any of techniques discussed herein.

Example Clauses

A. A system comprising: one or more cameras; one or more processors; a human-machine interface; and computer-readable media having stored thereon computer-executable instructions, that, when executed by the one or more processors, configure the system to perform operations comprising: obtaining an image by the one or more cameras; obtaining a salient object label for an object in the image; generating a predicted word based at least in part on the salient object label; generating predicted phrases based at least in part on one or more of the predicted word or the salient object label; selecting one or more suggested utterances from among the predicted word and the predicted phrases; and outputting a representation of the one or more suggested utterances via the human-machine interface.

B. A system as paragraph A recites, the outputting including: rendering the image via the human-machine interface; and rendering the representation of the one or more suggested utterances as one or more labels superimposed over a location in the image corresponding to the object.

C. A system as either paragraph A or B recites, the outputting including: one or more of: rendering the one or more suggested utterances via the human-machine interface as a symbol, word, or phrase completion, rendering the one or more suggested utterances via the human-machine interface as a part of a rendered keyboard, rendering at a devoted portion of the human-machine interface, rendering a pictorial representation of the one or more suggested utterances via the human-machine interface, or outputting the one or more suggested utterances in as audio via the human-machine interface.

D. A system as any one of paragraphs A-C recites, the human-machine interface including a display and the outputting the one or more suggested utterances to the human-machine interface including: rendering, in a designated area of the display devoted to environmentally contextual predicted words or phrases, a portion of the one or more suggested utterances corresponding to predicted word or phrases that relate to surroundings of a user; ranking remaining portions of the one or more suggested utterances based at least in part on relatedness to the surroundings of the user; and rendering, at the display outside the designated area, the remaining portions in an order corresponding to the ranking.

E. A system as any one of paragraphs A-D recites, the operations further comprising: receiving an input indicative of a selection of a word or a phrase of the one or more suggested utterances; provisioning for output the selected word or phrase to one or more of: a network interface, an application stored on the computer readable media, or the human-machine interface.

F. A system as any one of paragraphs A-E, recites, wherein the receiving an input indicative of a selection includes: obtaining gaze data by the one or more cameras; and correlating the gaze data with a discrete portion of the human-machine interface, the discrete portion corresponding to one of the predicted word or predicted phrases.

G. A system as any one of paragraphs A-F recites, further comprising one or more microphones and the operations further comprising: capturing audio data via the one or more microphones; determining a conversational context based at least in part on the audio data, the conversational context including one or more of syntax information, semantic information, or key words; and wherein at least one of: the generating the predicted word, the generating the predicted phrases, the selecting the one or more suggested utterances, or the outputting the one or more suggested utterances via the human-machine interface, is further based on the conversational context.

H. A system as any one of paragraphs A-G recites, the operations further comprising: capturing gaze data of a user of the system; identifying at least one of a portion of the human-machine interface or the salient object based at least in part on the gaze data; and wherein at least one of: the generating the predicted word, the generating the predicted phrases, the selecting the one or more suggested utterances, or the outputting the one or more suggested utterances via the human-machine interface, is further based on the identifying.

I. A system as any one of paragraphs A-H recites, the operations further comprising: identifying, based at least in part on the gaze data, one or more of: a portion of a user interface rendered via the human-machine interface, a representation of the object, a portion of the image, a portion of an environment of the user, or a subset of options for input rendered via the human-machine interface.

J. A system as any one of paragraphs A-I recites, the operations further comprising: determining a condition or a position of the object, the object being a first object; determining a second salient object label for a second object in the image; identifying a relative position of the first object relative to the second object; and wherein at least one of: the generating the predicted word, the generating the predicted phrases, the selecting the one or more suggested utterances, or the outputting the one or more suggested utterances via the human-machine interface, is further based on one or more of one or more of: the second salient object label, a co-occurrence of the first object and the second object in the image, or the condition, the position, or the relative position of the first object.

K. A system as any one of paragraphs A-J recites, the operations further comprising: obtaining application data, the application data including one or more of: an identification of an application-in-use or a recently-used application and identifiers of functionality of the application-in-use or the recently-used application, an identifier of a portion of the application-in-use or the recently-used application designated to receive the one or more suggested utterances, or a usage history or data stored by an application stored on the computer-readable media; and wherein at least one of: the generating the predicted word, the generating the predicted phrases, the selecting the one or more suggested utterances, or the outputting the one or more suggested utterances via the human-machine interface, is further based on the application data.

L. A system as any one of paragraphs A-K recites, wherein the image is an image of physical surroundings of the user.

M. A method comprising: identifying candidate utterances on behalf of a user, the identifying including: obtaining contextual data, the contextual data including one or more of: data regarding physical surrounds of the user, data regarding a digital context of the user, or historical data of the user; generating the candidate utterances based at least in part on the contextual data, the generating including one or more of: weighting the candidate utterances based at least in part on the contextual data, filtering the candidate utterances based at least in part on the contextual data, or sorting the candidate utterances based at least in part on the contextual data; and providing a representation of the candidate utterances to the user; receiving an input indicative of a selection from the user of one of the candidate utterances as a desired utterance; and outputting the desired utterance on behalf of the user.

N. A method as paragraph M recites, the contextual data including an image and the method further comprising: identifying a salient object in the image; determining a salient object label for the salient object; and generating the candidate utterances based at least in part on the contextual data and the salient object label.

O. A method as either paragraph M or N recites, wherein obtaining contextual data further includes obtaining the image from local storage or remote storage.

P. A method as any one of paragraphs M-O recites, wherein the image is an image of the physical surroundings of a user.

Q. A method as any one of paragraphs M-P recites, further including, after receiving the input indicative of the selection: generating second candidate utterances based at least in part on the input indicative of the selection and the contextual data; receiving a second input indicative of a selection from the user of a particular candidate utterance as the desired utterance; and outputting the desired utterance on behalf of the user.

R. A device comprising: one or more processors; a human-machine interface; computer-readable media having stored thereon computer-executable instructions that, when executed, configure the processors to perform operations comprising: obtaining contextual data regarding a user of the device, the contextual data including one or more of data regarding a digital environment of the user, data regarding physical surroundings of the user, or historical data regarding the user; generating candidate utterances based at least in part on the contextual data; and outputting one or more of the candidate utterances to the human-machine interface for representation of the candidate utterances to a user.

S. A device as paragraph R recites, the device further comprising one or more of: an operating system stored on the computer-readable media, an application stored on the computer-readable media, a camera, a microphone, a network interface, one or more sensors configured to monitor movements of the user; and the contextual data including one or more of: gaze data associated with the user; time elapsed since a last utterance of the user or operation conducted on or on behalf of the user; an activity identifier inferred from motions of the user received from the one or more sensors; application data obtained from the application or by querying the operating system regarding the application; operation system information or information provided by the operation system; an utterance output destination or purpose; a previous utterance obtained from the camera, the microphone, the operating system, the application, or the computer-readable media, or by the network interface; phonological, syntactical, or semantical information of previous utterances; a salient object identified in an image obtained by the camera or otherwise retrieved by the device; or a classification of a co-occurrence of a subset of the contextual data.

T. A device as either paragraph R or S recites, the device the further comprising: a speaker, a display, a network interface, an operating system stored in the computer-readable media, and an application stored in the computer-readable media; and the operations further comprising: receiving an input indicative of a selection from the user of one of the candidate utterances as a selected utterance; and outputting the utterance, the outputting including one or more of: representing the candidate utterances via the human-machine interface; outputting the utterance via the speaker, outputting the utterance via the display, or outputting the utterance to one or more of the application, the operating system, or the network interface.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The modules described herein represent instructions that can be stored in any type of computer-readable medium and can be implemented in software and/or hardware. All of the methods and processes described above can be embodied in, and fully automated via, software code modules and/or computer-executable instructions executed by one or more computers or processors, hardware, or some combination thereof. Some or all of the methods can alternatively be embodied in specialized computer hardware.

Conditional language such as, among others, "can," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. can be either X, Y, or Z, or any combination thereof. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions can be deleted, or executed out of order from that shown or discussed, including substantially synchronously or in reverse order, depending on the functionality involved as would be understood by those skilled in the art.

It should be emphasized that many variations and modifications can be made to the above-described examples, the elements of which are to be understood as being among other acceptable examples. All such modifications and variations are intended to be included herein within the scope of this disclosure and protected by the following claims.

What is claimed is:

1. A system for improved communications throughput for at least one user by reducing a communication throughput time or increasing a communication throughput rate at which communication is produced, the system comprising:
   one or more cameras;
   one or more microphones;
   one or more processors;
   a human-machine interface; and
   computer-readable media having stored thereon computer-executable instructions, that, when executed by the one or more processors, configure the system to perform operations comprising:
      obtaining an image by the one or more cameras;
      obtaining a salient object label for an object in the image;
      capturing audio data via the one or more microphones;
      determining a conversational context based on the audio data, the conversational context including one or more of syntax information, semantic information, and key words;
      generating a predicted word based on the salient object label;
      generating predicted phrases based on the predicted word, the salient object label, the object in the image, and the conversational context;
      selecting one or more suggested utterances from among the predicted word and the predicted phrases; and
      outputting a representation of the one or more suggested utterances via the human-machine interface, thereby providing improved communications throughput for the at least one user by reducing the communication throughput time or increasing the communication throughput rate at which communication is produced.

2. The system as claim 1 recites, the outputting including:
rendering the image via the human-machine interface; and
rendering the representation of the one or more suggested utterances as one or more labels, the one or more labels being displayed as one or more superimposed labels over a location in the image corresponding to the object.

3. The system as claim 1 recites, the outputting including: one or more of:
rendering the one or more suggested utterances via the human-machine interface as a symbol, word, or phrase completion,
rendering the one or more suggested utterances via the human-machine interface as a part of a rendered keyboard,
rendering at a devoted portion of the human-machine interface, or
rendering a pictorial representation of the one or more suggested utterances via the human-machine interface.

4. The system as claim 1 recites, the human-machine interface including a display and the outputting the one or more suggested utterances to the human-machine interface including:
rendering, in a designated area of the display devoted to environmentally contextual predicted words or phrases, a portion of the one or more suggested utterances corresponding to predicted word or phrases that relate to surroundings of a user;
ranking remaining portions of the one or more suggested utterances based on relatedness to the surroundings of the user; and
rendering, at the display outside the designated area, the remaining portions in an order corresponding to the ranking, the remaining portions being displayed as one or more superimposed labels over a location in the image corresponding to the surroundings of the user.

5. The system as claim 1 recites, the operations further comprising:
receiving an input indicative of a selection of a word or a phrase of the one or more suggested utterances;
provisioning for output the selected word or phrase to one or more of:
a network interface,
an application stored on the computer readable media, or
the human-machine interface.

6. The system as claim 5 recites, wherein the receiving an input indicative of a selection includes:
obtaining gaze data by the one or more cameras; and
correlating the gaze data with a discrete portion of the human-machine interface, the discrete portion corresponding to one of the predicted word or predicted phrases.

7. The system as claim 1 recites, wherein at least one of the generating the predicted word, the selecting the one or more suggested utterances, and the outputting the one or more suggested utterances via the human-machine interface, is further based on the conversational context.

8. The system as claim 1 recites, the operations further comprising:
capturing gaze data of a user of the system;
identifying at least one of a portion of the human-machine interface or the salient object based on the gaze data; and
wherein at least one of:
the generating the predicted word,
the generating the predicted phrases,
the selecting the one or more suggested utterances, or
the outputting the one or more suggested utterances via the human-machine interface,
is further based on the identifying.

9. The system as claim 8 recites, the operations further comprising:
identifying, based on the gaze data, one or more of:
a portion of a user interface rendered via the human-machine interface,
a representation of the object,
a portion of the image,
a portion of an environment of the user, or
a subset of options for input rendered via the human-machine interface.

10. The system as claim 1 recites, the operations further comprising:
determining a condition or a position of the object, the object being a first object;
determining a second salient object label for a second object in the image;
identifying a relative position of the first object relative to the second object based on the condition or the position of the object and based on a condition or a position of the second object; and
wherein at least one of:
the generating the predicted word,
the generating the predicted phrases,
the selecting the one or more suggested utterances, or
the outputting the one or more suggested utterances via the human-machine interface,
is further based on one or more of one or more of:
the second salient object label,
a co-occurrence of the first object and the second object in the image, or
the condition of the first object, the position of the first object, or the relative position of the first object to the second object.

11. The system as claim 1 recites, the operations further comprising:
obtaining application data, the application data including one or more of:
an identification of an application-in-use or a recently-used application and identifiers of functionality of the application-in-use or the recently-used application,
an identifier of a portion of the application-in-use or the recently-used application designated to receive the one or more suggested utterances, or
a usage history or data stored by an application stored on the computer-readable media; and
wherein at least one of:
the generating the predicted word,
the generating the predicted phrases,
the selecting the one or more suggested utterances, or
the outputting the one or more suggested utterances via the human-machine interface,
is further based on the application data.

12. The system as claim 1 recites, wherein the image is an image of physical surroundings of the user.

13. A method for improved communications throughput for at least one user by reducing a communication throughput time or increasing a communication throughput rate at which communication is produced, the method comprising:
obtaining an image by one or more cameras;
obtaining a salient object label for an object in the image;
capturing audio data via one or more microphones;
determining a conversational context based on the audio data, the conversational context including one or more of syntax information, semantic information, and key words;
generating a predicted word based on the salient object label;
generating predicted phrases based on the predicted word, the salient object label, the object in the image, and the conversational context;
selecting one or more suggested utterances from among the predicted word and the predicted phrases; and
providing a representation of the one or more suggested utterances to a user via a human-machine interface, thereby providing improved communications throughput for the at least one user by reducing the communication throughput time or increasing the communication throughput rate at which communication is produced.

14. The method as claim 13 recites, further comprising:
generating the one or more suggested utterances based on contextual data and the salient object label, the contextual data including: data regarding physical surrounds of the user, data regarding a digital context of the user, and the generating including:
weighting the candidate utterances based at least in part on the contextual data,
filtering the candidate utterances based at least in part on the contextual data, and
sorting the candidate utterances based at least in part on the contextual data.

15. The method as claim 14 recites, further comprising:
obtaining another image from local storage or remote storage.

16. The method as claim 15 recites, wherein the another image is an image of the physical surroundings of the user.

17. The method as claim 14 recites, further comprising:
receiving an input indicative of a selection from the user of one of the one or more suggested utterances as a desired utterance;
after receiving the input indicative of the selection:
generating one or more second suggested utterances based on the input indicative of the selection and the contextual data;
receiving a second input indicative of a selection from the user of a particular suggested utterance as the desired utterance; and
outputting the desired utterance on behalf of the user.

18. A device for improved communications throughput for at least one user by reducing a communication throughput time or increasing a communication throughput rate at which communication is produced, the device comprising:
one or more processors;
one or more cameras;
one or more microphones;
a human-machine interface; and
computer-readable media having stored thereon computer-executable instructions that, when executed, configure the one or more processors to perform operations comprising:
obtaining an image by the one or more cameras;
obtaining a salient object label for an object in the image;
capturing audio data via the one or more microphones;
determining a conversational context based on the audio data, the conversational context including one or more of syntax information, semantic information, and key words;
generating a predicted word based on the salient object label;
generating predicted phrases based on the predicted word, the salient object label, the object in the image, and the conversational context;
selecting one or more suggested utterances from among the predicted word and the predicted phrases; and
outputting a representation of the one or more of the suggested utterances via the human-machine interface, thereby providing improved communications throughput for the at least one user by reducing the communication throughput time or increasing the communication throughput rate at which communication is produced.

19. The device as claim 18 recites, the device further comprising one or more of:
an operating system stored on the computer-readable media,
an application stored on the computer-readable media,
a network interface, and
one or more sensors configured to monitor movements of a user,
wherein determining the conversational context is further based on one or more of:
gaze data associated with the user;
time elapsed since a last utterance of the user or operation conducted on or on behalf of the user;
an activity identifier inferred from motions of the user received from the one or more sensors;
application data obtained from the application or by querying the operating system regarding the application;
operation system information or information provided by the operation system;
an utterance output destination or purpose;
a previous utterance obtained from the one or more cameras, the one or more microphones, the operating system, the application, or the computer-readable media, or by the network interface;
phonological, syntactical, or semantical information of previous utterances;
a salient object identified in an image retrieved by the device; or
a classification of a co-occurrence of a subset of the conversational context.

20. The device as claim 18 recites, the device the further comprising:
a speaker,
a display,
a network interface,
an operating system stored in the computer-readable media, and
an application stored in the computer-readable media,
wherein the one or more processors are further configured to perform the operations comprising:

receiving an input indicative of a selection from a user of one of the one or more suggested utterances as a selected utterance; and outputting the selected utterance, the outputting including one or more of:
 outputting the selected utterance via the speaker,
 outputting the selected utterance via the display, or
 outputting the selected utterance to one or more of the application, the operating system, or the network interface.

* * * * *